United States Patent [19]

Fukushima et al.

[11] 4,277,156
[45] Jul. 7, 1981

[54] FOCUSING POSITION DETECTION APPARATUS

[75] Inventors: Yoshio Fukushima, Machida; Yoshiaki Kanmoto, Tokyo, both of Japan

[73] Assignee: Ricoh Company, Ltd., Japan

[21] Appl. No.: 45,937

[22] Filed: Jun. 6, 1979

[30] Foreign Application Priority Data

Jun. 10, 1978 [JP] Japan .................................. 53/69990

[51] Int. Cl.³ ................................................. G03B 3/10
[52] U.S. Cl. ......................................... 354/25; 354/31
[58] Field of Search ..................... 354/25, 31; 352/140; 355/56

[56] References Cited

U.S. PATENT DOCUMENTS

| 4,002,899 | 1/1977 | Stauffer ............................. 354/25 X |
| 4,189,232 | 2/1980 | Asano et al. ........................ 354/25 X |

FOREIGN PATENT DOCUMENTS 42-14096  8/1967  Japan .

Primary Examiner—Michael L. Gellner
Attorney, Agent, or Firm—McGlew and Tuttle

[57] ABSTRACT

An improved focusing position detection apparatus is capable of detecting a focusing position speedily by use of a single photoelectric conversion element array. The photoelectric conversion element array is positioned so that the opposite end portions of the element array are at different distances, physically or optically, from an object and the photoelectric conversion element array is divided into three portions, the opposite end portions and an intermediate portion, and the electric output from each portion of the photoelectric conversion element is analyzed, whereby the moving direction of an optical system for obtaining the focusing position is determined.

11 Claims, 9 Drawing Figures

FOCUSING POSITION DETECTION APPARATUS

BACKGROUND OF THE INVENTION

The present invention relates to focusing position detection apparatus for speedily detecting a focusing position using a single photoelectric conversion array.

Conventionally, in ordinary range finder cooperative type cameras, a focusing position for lenses in the camera is detected by bringing double images in line with each other. In single-lens reflex cameras, photoelectric conversion elements, placed on an image formation surface or on an equivalent surface thereto, are employed. In the latter case, it is impossible to tell whether or not a focusing position is obtained only by an initial measurement. Referring to FIG. 1, supposing that a film surface FL is an image formation surface of a photographing lens LL and that a photoelectric conversion element PS is positioned in contact with the film surface FL and an object is focused at a distance La (which is not a minimum photographing distance, but a definite distance), which corresponds to the distance Fa between the film surface FL and the lens LL. As shown in FIG. 2, when the distance of lens movement (for instance, by setting the film side as positive direction) is plotted as abscissa and the output of a photoelectric conversion element PS as ordinate, the output of the photoelectric conversion element PS is Sp at an initial position Fp of the lens LL where the image is not focused. When an output Sq is obtained by moving the lens LL slightly, if Sq is greater than Sp, it is judged that such movement of the lens LL is correct and the lens LL is then further moved to Fr. At that time, an output Sr is obtained. With a further movement of the lens LL to Fa, an output Sa is obtained and with a still further movement of the lens LL to Ft, an output St is obtained. While moving the lens LL in the positive direction, a position Ft is obtained where the output of the photoelectric conversion element PS is decreased so that St becomes smaller than Sa, whereby it is judged that a focused position is Fa which is immediately before the position Ft. This procedure takes a lot of time before finding the focused position since the above-mentioned step has to be taken a number of times. If the initial position is at Fr with the output Sr obtained and the lens LL is then moved to the position Ft, slightly passing over the focused position, and the output St is obtained, Sr is greater than St and accordingly it is judged that the focused position is not in the direction of Ft from the viewpoint of Fr. As a result, the focused position has to be searched from the direction Fq. This situation is apt to occur when Fr is close to Fa. Furthermore, when Sq and St have an equal value, it cannot be decided in which direction the lens LL should be moved and, if the lens LL happens to be in the focusing position, the lens LL has to be moved from that position before concluding that the lens LL has already been in the focusing position. In any case, a complicated operation is required.

In order to eliminate such a complicated operation, a construction as shown in FIG. 3 is proposed, in which one additional photoelectric conversion element is used. Namely, a second photoelectric conversion element PS2 is positioned with a space d, in the direction of the optical axis, from a first photoelectric conversion element PS1. These two elements PS1 and PS2 produce their respective outputs with respect to the incident light from the same object. With respect to the output S1 of the element PS1 and the output S2 of the element PS2, the outputs at the two positions which are spaced slightly from each other are compared in their magnitude as done in the case of FIG. 1, so that the direction of the lens movement can be determined speedily. However, in this apparatus, two photoelectric conversion elements PS1 and PS2 have to be disposed and their respective outputs S1 and S2 have to be compared with each other. As a result, the apparatus becomes complex in the mechanism and oversized. Therefore, it is not suitable for small size cameras.

SUMMARY OF THE INVENTION

It is therefore a principal object of the present invention to provide a focusing position detecting apparatus for a lens or optical system which is capable of detecting a focusing position speedily, by use of a single photoelectric conversion element array.

In the present invention, a photoelectric conversion element array is positioned so that the opposite end portions of the element array are at different distances, physically or optically, from an object and the photoelectric conversion element array is divided into three portions, the opposite end portions and an intermediate portion, and the electric output from each portion of the photoelectric conversion element is analyzed, whereby the moving direction of an optical system for obtaining the focusing position is determined.

According to the present invention, detection of the focusing position can be speedily made by use of a single photoelectric conversion element array, with the photoelectric conversion element array slanted or with a transparent member disposed in front of the photoelectric conversion element array.

Another object of the present invention is to provide an improvement in a focusing position detection apparatus for focusing an image on an image forming surface with an optical focusing system having means for changing the focusing position thereof, comprising: a photoelectric conversion element adjacent to the image formation surface having three signal forming portions each with a light receiving surface disposed at different effective optical distances from the optical focusing system, with the effective optical distances of the respective signal forming portions increasing from one end of the photoelectric conversion element to an opposite end thereof. Measurement means are connected to the respective portions for measuring signals therefrom and analyzing means are connected to the measuring means for evaluating these signals. The analyzing means are connected to the means for changing the focusing position of the optical system in accordance with the evaluation of the respective signal values.

A still further object of the present invention is to provide an improvement in focusing position detection apparatus which is simple in design, rugged in construction, economical to manufacture and suitably small to be applicable to use in cameras and the like.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 4:
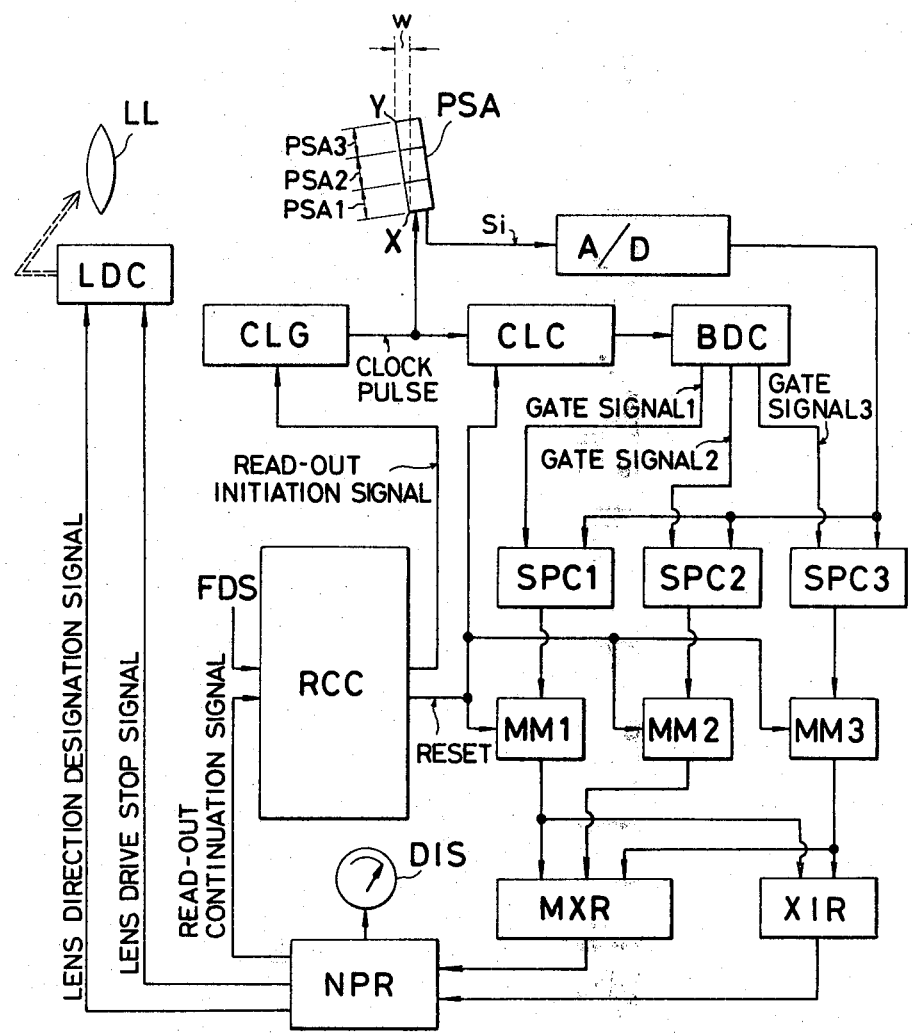
FIG. 4 is a block diagram of a first embodiment of a focusing position detection apparatus according to the present invention.

Referring to FIG. 4, there is shown a block diagram of a first embodiment of a focusing position detection apparatus of the present invention. Reference symbol LL represents a photographing lens and reference symbol PSA represents a photoelectric conversion element array. The photoelectric conversion element array PSA is slanted with respect to an object (not shown) so that the distance between the object and one end X of the element array PSA, and the distance between the object and the other end Y of the element array are different. The slanting angle of the photoelectric conversion element array PSA can be set as desired, but it is preferable that the distance W, between point X and point Y projected in the direction of the optical axis, do not exceed the space ($\Delta l$) between the position of the minimum photographing distance of the lens LL and the infinitely distant photographing position. When the distance W is chosen to be $\frac{1}{2} \cdot \Delta l$, even if the photographic lens is either at the position of the minimum photographing distance or at the infinitely distant photographing position, either the point X or the point Y of the photoelectric conversion element array PSA is at the focusing position. Therefore, when the lens LL is in another position, any point between the point X and the point Y of the element array PSA, is at the focusing point. As will be described in detail, the photoelectric conversion element array PSA can be divided into three portions, that is, one end portion PSA1, an intermediate portion PSA2 and the other end portion PSA3, so that the electric output of each portion is detected and processed.

Figure 1:
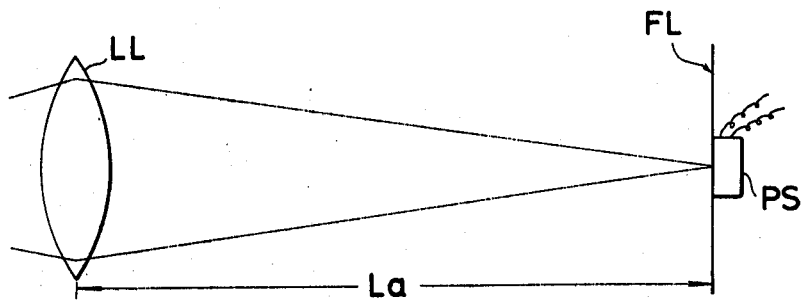
FIG. 1 shows schematically the construction of a conventional focusing position detection apparatus.
Figure 2:
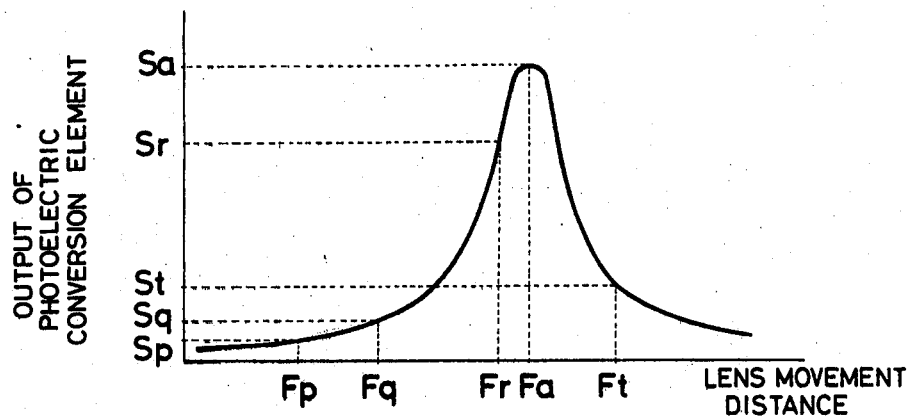
FIG. 2 shows the relationship between the output of a photoelectric conversion element and the distance of movement of a lens for explaining the operation of the conventional focusing position detection apparatus of FIG. 1.
Figure 5:
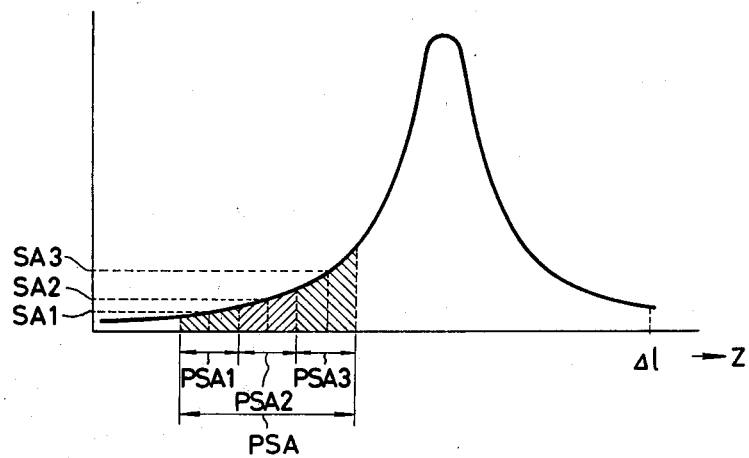
FIG. 5 is the operation diagram of the focusing position detection apparatus of FIG. 4.

Since the element array PSA is slanted with respect to an object, the relationship with the object of each element constituting the element array PSA is not the same. Therefore, when the element array PSA is divided into three blocks, it can be regarded that signals obtained from each block are the signals from the elements, constituting each block, which are positioned in the center of each block. Therefore, apparently, the signals from each block are different. The respective output signals from the blocks PSA1, PSA2 and PSA3 can be represented by the respective values, corresponding to the central elements of each block, on the curve shown in FIG. 5, which corresponds to FIG. 2. Here the respective outputs are named SA1, SA2 and SA3. When the central block PSA is on the left side of the maximum value of the curve in FIG. 5 within the range where the maximum value is not contained, SA1<SA2<SA3. When the central block PSA is on the right side of the maximum value under the same condition, SA1>SA2>SA3. When the maximum value of the curve is in PSA2, SA1 is smaller than SA2 and SA2 is greater than SA3. In other words, when the element array PSA receives an image which is positioned far from the focusing position, the maximum output value Smax of the outputs of the three signals is not equal to SA2, that is Smax≠SA2 and if SA1 is smaller than SA2, the lens LL should be moved to the right, and if SA1 is greater than SA2, the lens LL should be moved to the left.

When the element array PSA comes to receive an image which is very close to the focusing position by moving the lens LL, Smax becomes equal to SA2, that is, Smax=SA2 and thereafter, a position where SA2 becomes maximum is searched by detecting the value of SA2 while moving the lens LL in the same direction. In this case, after Smax becomes equal to SA2, the signals of SA1 and SA3 are not utilized.

If Smax is equal to SA2 at the initial operation, SA1 and SA3 are compared with each other and the lens LL is moved in the direction of a larger output. This is because, when the curve is not symmetrical with respect to its maximum value, the probability is sufficiently high that the maximum value is positioned closer to a larger one out of SA1 and SA3 than the present position. If SA1 is equal to SA3, the judgement is made as follows in accordance with the shape of the curve: When the shape of the curve is symmetrical or nearly symmetrical, it is judged that the present position is at the focusing position. When the curve is extremely unsymmetrical, for instance, with a gradual slope on the right side, the maximum value is positioned close to the block PSA1. Therefore, the lens LL is moved to the left. When the curve is unsymmetrical oppositely to the above, the lens LL is moved in the opposite direction.

Supposing that the apparatus in FIG. 4 is a focusing position detection apparatus for a camera, the apparatus will now be explained more specifically. First of all, a focus detection order signal FDS is read out and is applied to a control circuit RCC. The control circuit RCC resets a clock counter CLC (which will be described later), memory devices MM1, MM2 and MM3 beforehand and applies a read initiation signal to a clock pulse generator CLG. A photodiode and a condenser connected in parallel with the photodiode, or a CCD (charge coupled device) array is used as the photoelectric conversion element array PSA. Clock pulses generated from the clock pulse generator CLG with a predetermined interval enter the photoelectric conversion element array PSA and an output signal Si of each element is taken out in the form of a sequential signal by a mechanism similar to that of a shift register of the photoelectric conversion element array PSA. The signal S1 is converted into a digital signal by an A/D converter and is applied in parallel to signal processing circuits SPC1, SPC3. In the meantime, the signal Si is applied to the clock pulse counter CLC so that the clock pulse counter CLC counts from what bit of the element array PSA the present signal Si is generated. When the counted value of the block pulse counter CLC is applied to a block discrimination circuit BDC, the applied counted value is compared with a value that has been preset beforehand in the block discrimination circuit so that it is judged from which block out of the blocks PSA1, PSA2 and PSA3 of the element array PSA, the preset signal Si is produced. Since the signal Si is produced sequentially from one end, for example, X end, of the element array PSA, it can be determined from what bit of the X end or of what block, the signal Si is produced, by counting the the number of pulses. Furthermore, each block can be set so that it can be discriminated. As a result, if the signal Si comes from PSA1, a gate signal 1 is produced and the signal processing circuit SPC1 is actuated and the digital signal of the signal Si is received by the signal processing circuit SPC1. Likewise when the signal Si is judged to come from PSA2, a gate signal 2 is produced and the signal processing circuit SPC2 is actuated. The same thing applies to PSA3 and SPC3. Each of the signal processing circuits SPC1, SPC2 and SPC3 performs the operations, such as addition and division, so as to receive the signal from SA1, SA2 and SA3 and stores the received signal in the memory devices MM1, MM2 and MM3. The signal from each of the memory device MM1, MM2 and MM3 is applied in parallel to a maximum value decision circuit MXR. The maximum value decision circuit MXR judges whether the value of SA2 is maximum or not and when the value of SA2 is maximum, a predetermined output is produced. The output may be the value of the output of the memory device MM2. The outputs SA1 and SA3 from the memory devices MM1 and MM2 are applied in parallel to a magnitude decision circuit XIR and, for example, when the output SA1 is greater than the output SA2, a predetermined signal is produced. The respective signals from the decision circuits MXR and XIR are applied in parallel to a present position decision circuit NPR, which judges whether or not the present position is at a focusing position and, if the judgment is positive in view of the above-mentioned condition, a lens stop signal is applied to a lens drive circuit LDC and if the judgment is negative, a lens drive signal is produced, together with a lens drive direction designation signal. When the lens drive signal is set so that it can be switched to positive and negative, the lens drive signal can be produced simultaneously with the lens drive direction designation signal. When production of the lens drive signal is desired, a read-out continuation signal is applied to the read-out control circuit RCC and the focusing point judgment cycle is repeated by a new output of the element array PSA corresponding to a new position of the lens LL. When production of the lens stop signal is desired, a read-out stop signal is applied to the read-out control circuit RCC so that the condition of the read-out control signal RCC is retained. The judgment result of the present position can be separately displayed in a display apparatus DIS. The display apparatus DIS is desgined so that its pointer is turned to the right if there is an output from the magnitude decision circuit XIR, and its pointer is turned to the left if there is no output from the magnitude decision circuit XIR and, if there is an output from the maximum value decision circuit MXR, the display apparatus DIS is designed so that its pointer takes a central position.

When the output signal Si of the element array PSA is processed without using the A/D converter, an analog processing circuit is used for the processing of the output signal Si. The present position of the lens LL is indicated by a pointer of an ordinary ammeter and when the swing of the pointer becomes maximum, it is judged that the lens reaches the focusing position. When the focusing position is displayed by the display apparatus, the apparatus can be used for the manual drive of the lens. In other words, the display apparatus is disposed in a viewfinder and the lens is moved manually to the focusing position while watching the display apparatus.

Figure 6:
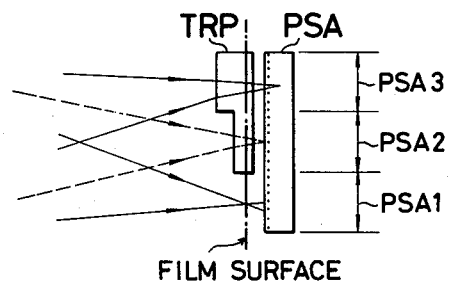
FIG. 6 shows schematically part of a second embodiment of a focusing position detection apparatus of the invention.
Figure 7:
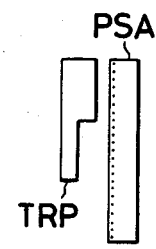
FIGS. 7 and 8 show schematically modified types of the second embodiment of FIG. 6.
Figure 8:
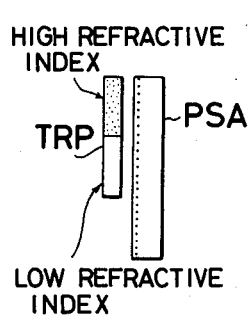

Referring to FIG. 6, there is schematically shown a photoelectric conversion element array of a second embodiment of a focusing apparatus of the invention. In FIG. 6, the element array PSA is positioned perpendicularly to the optical axis and on the object side of the blocks PSA2 and PSA3, there are disposed transparent members (TRP) with different thicknesses, respectively. The thickness of the transparent member TRP in fornt of the block PSA3 is two times that of the transparent member TRP in fornt of the block PSA2. As the materials for the transparent members, materials with a possible high refractive index should be chosen. The incident luminous flux from closely adjacent points on an object must converge on the image formation surface in accordance with the object distance of each point. Therefore, in front of the block PSA1, where no transpatent member is disposed, incident luminous flux converges on an expected image formation surface and scatters thereafter. In front of the block PSA2, where the thin transparent member is disposed, luminous flux is refracted in the direction where the converging state of the luminous flux is loosened when the luminous flux enters the transparent member. When the luminous flux comes out of the transparent member, the luminous flux converges again in the original direction thereof. Therefore, when the transparent member TRP is placed, the converging point is shifted backwards from its expected image formation surface. In front of the block PSA3, where the thick transparent member is disposed, the luminous flux is also refracted and its converging point is shifted backwards. Since the transparent member in front of the block PSA3 is two times thicker than that in front of the block PSA2, the movement distance of the converging point with respect to the block PSA3 is two times the movement distance of the converging point with respect to the block PSA2. Therefore, with respect to the luminous flux, the same effect is attained if the block PSA2 is disposed in front of the block PSA1 and further the block PSA3 is in front of the block PSA2. Supposing that luminous flux converges right on the light receiving surface of the block PSA2, it can be regarded that the block PSA1 is positioned behind the converging point and the block PSA3 is positioned in front of the converging point and the block PSA2 and the block PSA3 are respectively shifted at an equal distance from the converging point. In other words, the configuration of the photoelectric conversion element array PSA in FIG. 6 is similar to that in FIG. 5. Since, in FIG. 6, the overall surface of the block PSA2 is uniformly in the image formation state, the accuracy for detecting the focusing point can be increased. The film surface is positioned at the image formation surface which is expected to exist when the block PSA2 is in the focusing position. The clock pulses and other signals for driving the photoelectric conversion element array are the same as those shown in FIG. 4. In the construction in FIG. 6, since the transprarent member has steps near the boundary portions of the blocks, images are disordered, which may have adverse effects on the detection result. In order to eliminate such adverse effects, it is preferable not to use the signals from the elements near the boundary portions of the blocks in the signal processing procedure. Alternatively, the transparent member is turned inside out as shown in FIG. 7 or the refractive index in one portion is made different from that in the other portion as shown in FIG. 8. More specifically, a transparent member with a high refractive index and a transparent member with a low refractive index are combined with each, so that the ratio of the light path (refractive index ×thickness) in the direction of the thickness of the former transparent member to the light path in the direction of the thickness is 2:1, with the thickness of each transparent members set equal. When the two transparent members are equal in the thickness, the ratio of the respective refractive indexes of the two transparent members is 2:1.

Figure 9:
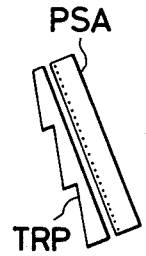
FIG. 9 shows schematically part of a third embodiment of a focusing position detection apparatus of the invention.

Referring to FIG. 9, there is shown a third embodiment of a focusing position detection apparatus, in which the first embodiment and the second embodiment are combined, according to the invention. In FIG. 9, the photoelectric conversion element array PSA is slanted and the transparent member is shaped so as to have wedge-shaped steps thereon, so that the thickness of he transparent member is reduced. In this embodiment, since the converging surface and the light receiving surface of each block are parallel, the detection of the focusing position is improved.

Figure 3:
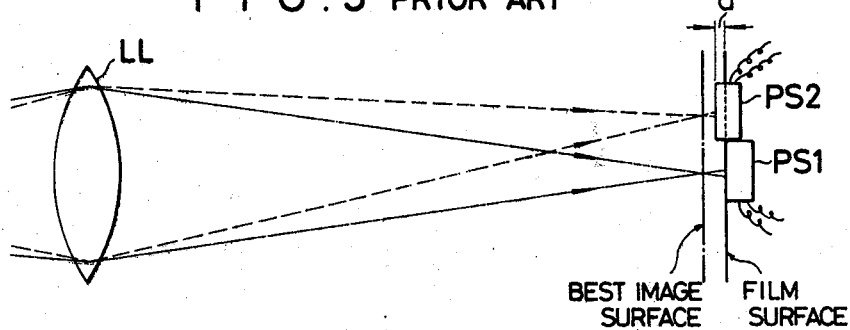
FIG. 3 shows schematically the construction of another conventional focusing position detection apparatus.

In summary, the inventive improvement comprises the photoelectric conversion element PSA which is positioned adjacent the image formation surface as shown in FIG. 3 and comprises three separate signal forming portions PSA 1, PSA 2, and PSA 3, each of which has an effective optical distance from the optical system exemplified by LL, with the effective optical distance increasing from one end Y of the conversion element to an opposite end X thereof. The conversion element is connected to a measuring means exemplified in FIG. 4 by the analogue to the digital converter, the clock pulse generator and clock pulse counter and the processing circuits SPC1, 2 and 3. This measuring means is connected to an analyzing means in the form of the memories, the maximum value decision circuit, the magnitudue decision circuit, the present position decision circuit with its display and the readout control circuit. As exemplified in FIG. 4 and FIGS. 6–9, the effective optical distance between the respective portions of the conversion elements can be defined either by the inclination of the entire conversion element with respect to the image formation surface shown in FIG. 4 or the provision of other suitable refractive elements in front of the photoelectric conversion element.

While specific embodiments of the invention have been shown and described in detail to illustrate the application of the principles of the invention, it will be understood that the invention may be embodied otherwise without departing from such principles.

What is claimed is:

1. In a focusing position detection apparatus for focusing an image on an image formation surface with an optical focusing system having means for changing the focusing position thereof, an improvement comprising: a single photoelectric conversion element adjacent the image formation surface having three signal forming portions each with a light receiving surface disposed at a different optical distance from the optical focusing system, the effective optical distances of said respective signal forming portions increasing from one end of said photoelectric conversion element to an opposite end thereof, measuring means connected to said signal forming portions for measuring respective signals produced thereby, and analyzing means connected to said measuring means for evaluating the respective signals from said measuring means, said analyzing means connected to said means for changing the focusing position of said optical focusing system in accordance with said evaluation to focus an image on the image formation surface with the optical focusing system, and indicating in which direction the focusing position is to be changed to focus the image, each of said receiving surfaces of said signal forming portions lie in a common plane and extend one after the other across said photoelectric conversion element, said common plane being inclined at an angle to said image formation surface whereby said light receiving surface of one of said signal forming portions at one end of said photoelectric conversion element is closer to the optical system than said light receiving surface of one of said signal forming portions on an opposite end of said photoelectric conversion element whereby the differences in said effective optical distances comprises physical differences in distance.

2. An improvement according to claim 1 further including a member made of refractive material extending across all of said light receiving surfaces of said photoelectric conversion element, said member having wedge shaped step portions each extending across one of said signal receiving portions of said photoelectric conversion element.

3. In a focusing position detection apparatus for focusing an image on an image formation surface with an optical focusing system having means for changing the focusing position thereof, an improvement comprising: a single photoelectric conversion element adjacent the image formation surface having three signal forming portions each with a light receiving surface disposed at a different effective optical distance from the optical focusing system, the effective optical distances of said respective signal forming portions increasing from one end of said photoelectric conversion element to an opposite end thereof, measuring means connected to said signal forming portions for measuring respective signals produced thereby, and analyzing means connected to said measuring means for evaluating the respective signals from said measuring means, said analyzing means connected to said means for changing the focusing position of said optical focusing system in accordance with said evaluation to focus an image on the image formation surface with the optical focusing system and indicating in which direction the focusing position is to be changed to focus the image, each of said light receiving surfaces being disposed in a common plane parallel to said image forming surface and extending one after another in a row along said photoelectric conversion element, and a transparent refractive member disposed in front of two of said light receiving surfaces with the refractive index of a portion of said member in front of said light receiving surface adjacent an end of said photoelectric conversion element being greater than that of a portion of said member in front of said light receiving surface between said two other light receiving surfaces.

4. An improvement according to claim 3 wherein said larger refractive index of said one member portion is twice as great as that of said other member portion.

5. An improvement according to claim 4 wherein said member portion adjacent an end of said photoelectric conversion element is made of material having a higher refractive index than said other member portion.

6. An improvement according to claim 3 wherein said member portion adjacent an end of said photoelectric conversion element is twice as thick as said other member portion, said member being made of material having a single refractive index.

7. An improvement according to claim 6 wherein a step is formed between the portions of said member facing the optical system.

8. An improvement according to claim 6 wherein a step is formed between said portions of said member facing away from said optical system.

9. An improvement according to claim 1 or 3 wherein said analyzing means includes a maximum value decision circuit for evaluating which of said signals from said respective signal forming portions is at a maximum value, and a present position decision circuit connected to said maximum value decision circuit for activating said means for changing the focusing position of the optical system in a direction corresponding to which signal from said signal forming portions at the ends of the said photoelectric conversion element is maximum, when the signal with a maximum value is from one of said signal forming portions at said conversion element ends.

10. An improvement according to claim 9 further including a magnitude decision circuit in said analyzing means connected to said measuring means said maximum value decision circuit and said present position decision circuit for comparing the values of the signals from said signal forming portions at the ends of said conversion element, said present position decision circuit deactivating said means for changing the focus of the optical system when the signal from said signal forming portion between said signal forming portions at the ends of said conversion element is at said maximum value.

11. An improvement according to claim 10 wherein the means for changing the focus of the optical system is deactivated only when the values of the signals from said signal forming portions at the ends of said conversion element are equal.

* * * * *